United States Patent [19]

Wilhelmy

[11] Patent Number: 5,136,893
[45] Date of Patent: Aug. 11, 1992

[54] TRANSMISSION SHIFT ROD WITH VIBRATION DAMPER

[75] Inventor: Egon Wilhelmy, Bad Honnef, Fed. Rep. of Germany

[73] Assignee: Ford Motor Company, Dearborn, Mich.

[21] Appl. No.: 518,383

[22] Filed: May 3, 1990

[30] Foreign Application Priority Data

May 20, 1989 [DE] Fed. Rep. of Germany ....... 3916569

[51] Int. Cl.⁵ ............................................. G05G 9/12
[52] U.S. Cl. ................................... 74/473 R; 74/581; 403/80; 403/341
[58] Field of Search ............. 74/473 R, 581; 464/180, 464/153; 403/80, 341

[56] References Cited

U.S. PATENT DOCUMENTS 3,015,968  1/1962  Szekely ............................ 74/473 R
3,617,078  11/1971 Valukonis ........................... 403/341
4,485,688  12/1984 Muth et al. ........................ 74/473 R
4,488,448  12/1984 Leuer ................................ 74/473 R
4,569,246  2/1986  Katayama et al. ................. 74/473 R
4,648,738  3/1987  Thielen ............................. 403/341
4,777,839  10/1988 Lindholm et al. ................. 74/473 R
4,960,009  10/1990 Schultz et al. .................... 74/473 R

FOREIGN PATENT DOCUMENTS 3634174  4/1987  Fed. Rep. of Germany .

Primary Examiner—Gary L. Smith
Assistant Examiner—Michael Milano
Attorney, Agent, or Firm—Frank G. McKenzie; Keith L. Zerschling

[57] ABSTRACT

A gearshift rod for an automotive manual transmission includes two tubular shift rods that support stop plates welded to the inner surface of the rods. Spaced axially along an overlapping region of the rod, located between the stop plates are resilient damping members. A resilient damping strip is located between the longitudinal edges of semicircular portions of the shift rods.

5 Claims, 1 Drawing Sheet

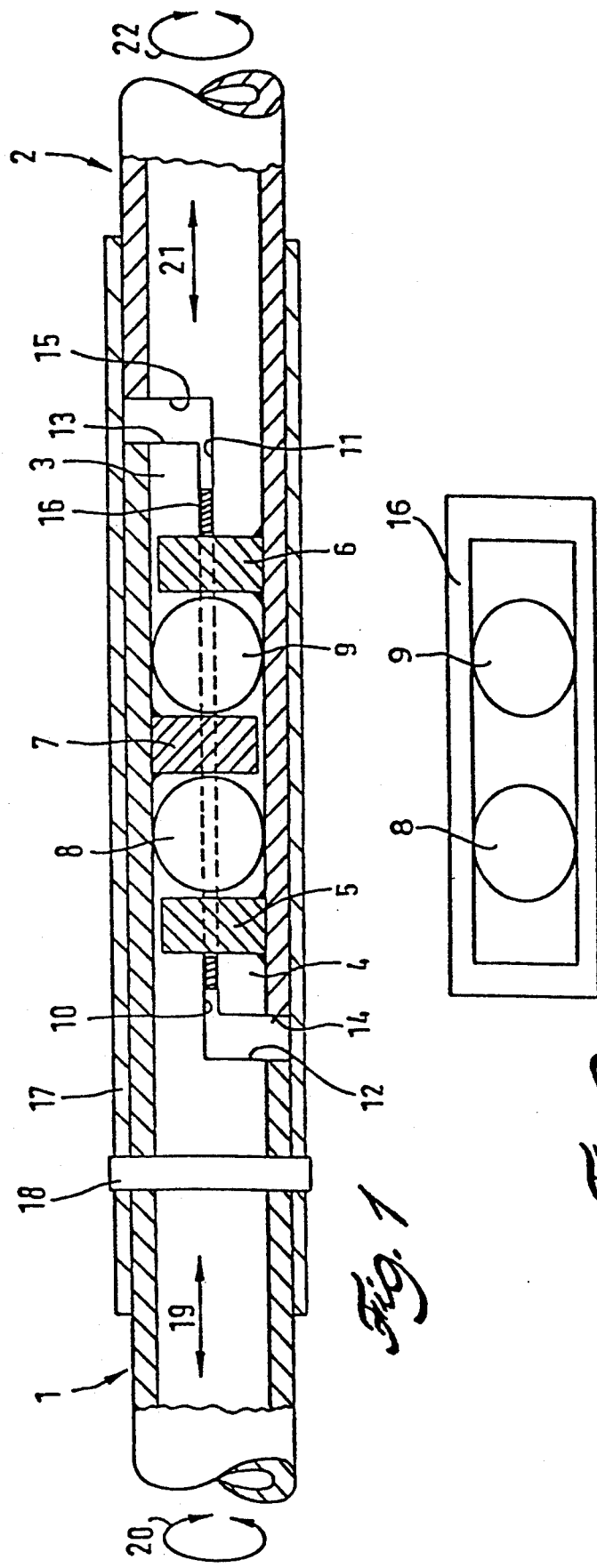

TRANSMISSION SHIFT ROD WITH VIBRATION DAMPER

BACKGROUND OF THE INVENTION

1. Field of the Invention

This invention relates to automotive manual transmissions, particularly to vibration damping in such transmissions.

2. Description of the Prior Art

German patent application DE-OS 36 34 174 describes a gear shift rod having a vibration damper. The rod consists of two tubular, mutually aligned shift rod portions, which transmit axial and rotary shifting motion produced by manual control of the vehicle operator on a gear selector lever. Resilient spring element located on a shift rod and rigid connecting elements, coaxial with and surrounding two shift rod portions, are provided. The shift rod assembly and vibration damper of this invention is costly to assemble and construct.

In the device described in the '174 patent application, a universal joint, connected by heavy dowel pins to a first shift rod portion, is fixed to a second shift rod portion. The two shift rod portions are surrounded by two tubular half shafts, held together by a tubular connecting element coaxially surrounding the two shift rod portions. Resilient spring elements in the form of O-rings also surround the shift rod portions.

This gear shift rod is able to damp pivoting movements between the two shift rod portions through radial deformation of the resilient spring elements, but axial and radial movements cannot be dampened by the heavy dowel pins because of the presence of a cordon-joint connection.

SUMMARY OF THE INVENTION

An object of this invention is to provide an improved gear shift rod having a vibration damper for controlling damping of axially directed vibratory movement as well as radial vibratory movement.

According to the invention, this object is achieved in a gear shift rod having two mutually aligned portions that transmit axial and rotary shifting movement. The tubular shift rods overlap mutually over an axial length along which the cross sections are each semicircular. Two circular plates are fixed to the inner surface of one of the overlapping semicircular tubular portions, and, between these plates, another circular plate is fixed to the inner surface of the other half tubular portion. Resilient damping members are located in the spaces between adjacent circular plates. Resilient damping strips are located between the longitudinal edges of semicircular, overlapping extensions of the tubular shift rod portions.

The tubular shift rod portions are mutually aligned and overlap over a predetermined axial length over which one-half of the cross section is removed alternately to form half-shells, whose inner surfaces face one another. Two approximately circular stop plates spaced axially one from another are fixed to one of the half-shell portions. Midway between these stop plates, a third stop plate is fixed to the other semicircular tubular portion. Resilient dampers of conical, cylindrical or spherical shape are located in the space between adjacent stop plates. The two shift rod portions rest on one another by way of a resilient damping strip located between the longitudinal edges of their semicircular, axially extending portions. Axial vibratory movements are dampened by the resilient damping member and radial vibratory movements are absorbed by the resilient damping strip located between the longitudinal edges of the half-shells.

Because the resilient damping members are conical, cylindrical or spherical members, the desired magnitude of vibratory damping can be developed with accuracy in a favorable manner. The resilient damping strip, preferably located in the form of a space between the longitudinal edges of the half-shells, prevents undesirable clattering due to radial vibratory movement, but guarantees reliable transmission of rotary shifting movement because of the torsional rigidity inherent in the design.

BRIEF DESCRIPTION OF THE DRAWING

The invention is described in more detail with reference to an embodiment illustrated in the accompanying drawing.

FIG. 1 shows a vertical cross section through a gear shift rod having a vibration damper.

FIG. 2 is a plan view of the damping element of FIG. 1.

DESCRIPTION OF THE PREFERRED EMBODIMENT

The portion of the shift rod shown in FIG. 1 is suitable for use over a portion of the axial length of a gear shift rod for a manually operated automotive transmission. An example of a shift rod to which this invention can be applied is shaft 214, illustrated and described in U.S. Pat. No. 4,222,281. The entire disclosure of the '281 patent is hereby incorporated by reference. The gear shift rod shown in FIG. 1 includes a first tubular shift rod portion 1, which is aligned with a second tubular shift rod portion 2. With reference to the '281 patent, rod portions 1 and 2 and the other components shown in FIGS. 1 and 2 can be substituted for a portion of the length of shaft 214 of the patent.

The two shift rod portions are preferably circular tubes along that portion of their lengths that are distant from the portion shown in FIG. 1. However, each of the tubes has a semicircular portion removed over a length that extends from the end of each tube 13, 14 to the end of full tubular cross section 12, 15. Each tube overlaps the other tube such that the inner surface of semicircular shell portion 3 faces the inner surface of semicircular shell portion 4.

Circular stop plates 5 and 6 are fixed on the inner surface of the tubular half-shell 4 of rod portion 2 by welding, projection welding, or soldering, are mutually spaced along shell 4. Shell 3 carries a stop plate 7 located between and spaced from plates 5, 6.

Resilient damping members 8 and 9, shown in FIG. 1 as spheres, are located in the spaces between the stop plates 5, 6 and 7. Alternately, damping members 8, 9, can be cylindrical or conical in order to achieve a particular damping characteristic.

The two half-shells 3, 4 have longitudinal edges 10, 11 and end edges 12, 13 and 14, 15 located in or adjacent to the overlapping regions.

The resilient damping strip 16, formed as a rectangular frame in plan view, as shown in FIG. 2, is located between the longitudinal edges 10, 11 of the half-shells 3, 4.

After resilient damping members 8, 9 are inserted into the spaces provided for them, and the damping strip is located in position, the two half-shells 3 and 4 are joined together by a tubular connecting element 17, coaxially surrounding the two half-shells 3, 4. Connecting element 17 can be fixed on one shift rod portion 1 by a dowel pin 18, but other means of fixing element 17 to the tubes 1, 2 such as by welding, rolling or the like, are possible. If shift rod portion 1 is connected to a gear shift shaft and shift rod portion 2 is connected to a shaft connected to a manual shift lever, then axial vibratory movement and radial vibratory movement are transmitted from an engine through a transmission to the shift lever, controlled manually by the vehicle operator. These movements lead to undesirable vibration of the manual shift lever in the absence of vibration damping.

On the shift rod portion 1, axial vibration is indicted by a double arrow 19 and radial vibration by rotating arrow 20.

In the embodiment illustrated, there is a clearance between stop plates 5, 6, 7 and damping members 8, 9 so that vibrations of small amplitude do not affect the right-hand shift rod portion 2, connected to the shift lever controlled by the vehicle operator. Damping members 8 and 9 are operative in the event greater vibration amplitudes are produced than the width of the clearances provided between the stop plates and damping members.

On the right-hand shift rod portion 2, the axial shift movements are indicated by a double arrow 21 and gear selector movements, originating from the manual shift lever controlled by the vehicle operator, are indicated by rotating arrow 22.

Therefore, if shift rod portion 2 is turned radially to preselect a shift plane by moving the shift lever, this rotary movement is transmitted without clattering via resilient damping strip 16 onto the shift rod portion 1. Due to the subsequent axial engagement of shift rod portion 2, stop plate 6 loads the damping member 9, which transmits the shift movement onto the stop plate 7.

Damping members 8 and 9 must therefore be constructed so that the desired feel of shifting is achieved when operating the manual shift lever. The end edges 12, 14, 13, 15 between the shift rod portions must be arranged with sufficient spacing so that they do not impair operation of damping members 8 and 9.

The radial dimension of the damping members and the thickness of the resilient damping strips 16 are selected such that the two half-shells 3, 4 spring outward somewhat. The tubular connecting element 17, therefore, grips the half-shells 3, 4 and shift rod portions 1 and 2 without clearance and without clattering. A suitable lubricant should be provided between the shift rod portions 1 and 2 and connecting element 17.

Having described a preferred embodiment of my invention, what I claim and desire to secure by U.S. Letters Patent is:

1. A gear shift rod for transmitting gear selection control movement between a gear shift lever and a gear shift mechanism in an automotive manual transmission, comprising:
    first and second tubes, mutually aligned, each tube having a portion overlapping a corresponding portion of the other tube along an axial length of said tubes;
    stop plates fixed to the overlapping portions of said tubes, stop plates on the first tube being interposed between stop plates on the second tube, each stop plate being spaced axially from an adjacent stop plate;
    damping members formed of resilient elastomer located between adjacent stop plates contacting the first and second tubes; and
    means for connecting the first and second tubes.

2. The gear shift rod of claim 1 wherein the first and second tubes have a portion, located at the end of each tube and extending along a portion of the length thereof, removed from the cross section of each tube, the remaining portion of the cross section of the first tube overlapping the remaining portion of the cross section of the second tube.

3. The gear shift rod of claim 2 wherein the overlapping portion of the first tube has longitudinal edges facing longitudinal edges of the overlapping portion of the second tube, said edges being mutually spaced, and further comprising:
    a damping strip formed of resilient elastomer, located in a space between the edges of the first and second tubes and contacting said edges.

4. The gear shift rod of claim 2 wherein the overlapping portions of the first tube have longitudinal edges located at laterally opposite sides of said tube facing longitudinal edges of the overlapping portions of the second tube located at laterally opposite sides of the second tube, said edges being mutually spaced angularly, and further comprising:
    a damping frame formed of resilient elastomer, having first and second longitudinal strips directed along the axis of the tubes, each longitudinal strip located on a laterally opposite side of said axis, and lateral strips directed across said axis, the longitudinal strips located in a space between the longitudinal edges of the first and second tubes and contacting said edges.

5. A gear shift rod for transmitting gear selection control movement between a gear shift lever and a gear shift mechanism in an automotive manual transmission, comprising:
    first and second tubes, mutually aligned, each tube having a portion overlapping a corresponding portion of the other tube along an axial length of said tubes, the first and second tubes having a portion, located at the end of each tube and extending along a portion of the length thereof, removed from the cross section of each tube, the remaining portion of the cross section of the first tube overlapping the remaining portion of the cross section of the second tube;
    stop plates fixed to the overlapping portions of said tubes, stop plates on the first tube being interposed between stop plates on the second tube, each stop plate being spaced axially from an adjacent stop plate;
    a damping member formed of resilient elastomer including:
        damping elements located between adjacent stop plates contacting the first and second tubes,
        a damping frame, formed integrally with the damping elements, having first and second longitudinal strips directed along the axis of the tubes, each longitudinal strip located on a laterally opposite side of said axis, and lateral strips directed across said axis, the longitudinal strips located in a space between the longitudinal edges of the first and second tubes and contacting said edges; and
    means for connecting the first and second tubes.

* * * * *